US009047130B2

(12) United States Patent
Chen et al.

(10) Patent No.: US 9,047,130 B2
(45) Date of Patent: Jun. 2, 2015

(54) METHOD, SERVER AND SYSTEM FOR CONVERGING DESKTOP APPLICATION AND WEB APPLICATION

(75) Inventors: Ying Chen, Beijing (CN); Xing Fang, Beijing (CN); Jie Qiu, Beijing (CN); Qing Bo Wang, Beijing (CN); Meng Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/534,819

(22) Filed: Jun. 27, 2012

(65) Prior Publication Data

US 2012/0297377 A1    Nov. 22, 2012

Related U.S. Application Data

(62) Division of application No. 12/675,456, filed as application No. PCT/EP2008/061313 on Aug. 28, 2008.

(30) Foreign Application Priority Data

Aug. 30, 2007  (CN) .......................... 2007 1 0147118

(51) Int. Cl.
   *G06F 15/16*      (2006.01)
   *G06F 9/50*       (2006.01)

(52) U.S. Cl.
   CPC .................................... *G06F 9/5055* (2013.01)

(58) Field of Classification Search
   USPC ......................................................... 709/219
   See application file for complete search history.

(56) References Cited

U.S. PATENT DOCUMENTS 6,598,067 B1   7/2003  Wydra et al.
6,950,991 B2   9/2005  Bloomfield et al.
            (Continued)

FOREIGN PATENT DOCUMENTS

EP      1755041 A2    2/2007
JP    2005505051      2/2005
            (Continued)

OTHER PUBLICATIONS

Arno Puder, "Extending Desktop Applications to the Web," symposium, 2004, 8-13, ACM International Conference Proceeding Series, vol. 90; Trinity College Dublin, Las Vegas, NV.
            (Continued)

*Primary Examiner* — Alicia Baturay
(74) *Attorney, Agent, or Firm* — Tutunjian & Bitetto, P.C.; Preston J. Young

(57) ABSTRACT

A method, Web server and computer system are provided for converging a desktop application and a Web application. The method includes in response to a request from a client user for using a target desktop application, starting a desktop application initialization process on the Web server and determining an appropriate corresponding hosting server for the user; preparing and provisioning desktop application environment on the corresponding hosting server and starting the target desktop application; transmitting the corresponding hosting server's address to the client so as to make desktop application interaction between the client and the corresponding hosting server; and in response to the completion of the desktop application interaction, stopping and exiting the target desktop application on the corresponding hosting server. The client user is provided with a unified Web console for accessing desktop applications and Web applications, and Web files are shared between the desktop applications and the Web applications.

13 Claims, 6 Drawing Sheets

(56) References Cited

U.S. PATENT DOCUMENTS

| | | | |
|---|---|---|---|
| 7,324,648 B1* | 1/2008 | Deaver et al. | 380/278 |
| 7,330,872 B2* | 2/2008 | Peart et al. | 709/203 |
| 7,370,120 B2* | 5/2008 | Kirsch et al. | 709/246 |
| 7,373,330 B1* | 5/2008 | Klebe | 705/51 |
| 7,400,322 B1* | 7/2008 | Urbach | 345/419 |
| 7,412,625 B2* | 8/2008 | Shankar et al. | 714/38.14 |
| 7,577,722 B1* | 8/2009 | Khandekar et al. | 709/220 |
| 7,620,899 B2* | 11/2009 | Abdo et al. | 715/740 |
| 7,827,590 B2* | 11/2010 | Hopen et al. | 726/1 |
| 8,176,482 B1* | 5/2012 | Felix | 717/168 |
| 8,549,149 B2* | 10/2013 | Sundarrajan et al. | 709/227 |
| 2003/0187983 A1* | 10/2003 | Rajic et al. | 709/225 |
| 2004/0205101 A1 | 10/2004 | Radhakrishnan | |
| 2004/0221065 A1 | 11/2004 | Banerjee et al. | |
| 2006/0132489 A1 | 6/2006 | Blaho | |
| 2010/0313199 A1* | 12/2010 | Chen et al. | 717/177 |

FOREIGN PATENT DOCUMENTS

| | | |
|---|---|---|
| JP | 2005517254 | 6/2005 |
| JP | 2010531488 | 9/2010 |
| WO | WO0215604 A | 2/2002 |
| WO | WO2006107531 A | 10/2006 |

OTHER PUBLICATIONS

Huajun Zhang et al., "Converting an ArcGIS Desktop Application to ArcGIS Server Web Application," 2006 ESRI Federal User Conference, Washington, DC.

Ron Miller, "Get Rich Online: Rich internet Applications Pay Big Dividends," EContent, Apr. 1, 2006.

Stefan Paal et al., "A Cross-Platform Application Environment for Nomadic Desktop Computing," book, 2004, 185-200, vol. 3263/2004, Springer Berlin / Heidelberg.

Patent Cooperation Treaty. "International Search Report and Written Opinion of the International Searching Authority" Issued on Feb. 23, 2009 for International Application No. PCT/EP2008/061313. (8 Pages).

* cited by examiner

METHOD, SERVER AND SYSTEM FOR CONVERGING DESKTOP APPLICATION AND WEB APPLICATION

RELATED APPLICATION INFORMATION

This application is a Divisional application of co-pending U.S. patent application Ser. No. 12/675,456 filed on Aug. 20, 2010, incorporated herein by reference in its entirety.

TECHNICAL FIELD

The present invention generally relates to the field of computer technology, and more particularly to a method, apparatus and system for converging a desktop application and a Web application.

BACKGROUND

In the present information technology (IT) field, Web technology is widely applied because of its simplification, lightweight and based on open standards. More and more software vendors are dedicated to developing their applications based on Web technology. Compared with traditional desktop applications, Web applications have plenty of advantages, for example, Web applications do not require software installation and maintenance, which makes them easy to be distributed.

However, Web applications also have their limitations. A major problem thereof is that their HTML based user interface can't support advanced user interaction. Due to this problem, desktop applications still need to be used in many cases. In some cases, an end user needs to switch between a Web application and a desktop application to finish his work. For example, when a user is editing his BLOG, if he wants to add some photos or pictures, then firstly, he needs to find some required photos or pictures, and then he possibly needs to edit them. To do so, he must install some photo or picture editing software (i.e., a desktop application). After that, he needs to upload the edited photos or pictures to a Web application. However, such user experience is not so good because of some of the following reasons: (1) the integrity of the user's experience is broken; (2) the user must switch between different consoles; (3) Web application data and desktop application data can't be shared; (4) the user must install the required desktop application and maintain it periodically.

To enhance Web application capability, some technologies such as Java script, AJAX, ActiveX and Applet are widely used. For a Java script/AJAX approach, its idea is to write a Web application with the help of Java script, which is a script language providing interactive programming features. However, the use of Java script also has great limitations. For example, the first limitation is that Java script is executed by a translator and has poor performance; the second limitation is that some programming logic can't be implemented using Java script. For an ActiveX/Applet approach, it is not adopted very widely because of its poor compatibility. On the other hand, the user needs to download different plug-ins for different applications and the file size of some plug-ins may be so big that it needs a lot of time to be downloaded.

In view of the above situations, a technology is thus urgently required that can overcome defects in the prior art and converge a Web application and a desktop application so as to use the desktop application to process files of the Web application.

SUMMARY OF THE INVENTION

A brief summary on the present invention is given hereinafter to provide basic understanding of some aspects of the present invention. However, it should be understood that this summary is not an exhaustive description of the present invention. Moreover, it is not intended to determine critical or important parts of the present invention and to limit the scope of the present invention either. The summary is only used to give some concepts in a simplified form, which is taken as prolegomenon of the following more detailed description discussed later.

To resolve the above problems existing in the prior art, in a preferred aspect of the present invention there is provided a method for converging a desktop application and a Web application.

In accordance with another aspect of the present invention there is provided a Web server that facilitates convergence of a desktop application and a Web application, as well as a corresponding computer system.

In accordance with another aspect of the present invention there is provided a computer readable storage medium on which computer program codes for realizing the above method are stored or encoded, as well as a corresponding computer program product.

Viewed from a first aspect, the present invention provides a method for converging a desktop application and a Web application, the Web application being included in a Web server, the method comprising steps of: in response to a request from a client user for using a target desktop application, starting a desktop application initialization process on the Web server and determining an appropriate corresponding hosting server for the user; preparing and provisioning desktop application environment on the corresponding hosting server and starting the target desktop application; transmitting the corresponding hosting server's address to the client so as to make desktop application interaction between the client and the corresponding hosting server; and in response to the completion of the desktop application interaction, stopping and exiting the target desktop application on the corresponding hosting server.

Viewed from a second aspect, the present invention provides a Web server for converging a desktop application and a Web application, the Web server being capable of communicating with a client and one or more hosting servers and including a Web application and a desktop application service, wherein, the Web application generates a desktop application initialization request in response to a request from a user of the client for using a target desktop application, and generates a desktop application exit request in response to the completion of desktop application interaction; in response to the desktop application initialization request, the desktop application service starts a desktop application initializing process on the Web server, determines an appropriate corresponding hosting server for the user, prepares and provisions desktop application environment on it so that the corresponding hosting server could start the target desktop application and transmit the corresponding hosting server's address to the client, thereby making the desktop application interaction between the client and the corresponding hosting server; and in response to the desktop application exit request, the desktop application service stops and exits the target desktop application on the corresponding hosting server.

Viewed from a third aspect, the present invention provides a computer system for converging a desktop application and a Web application, comprising: a client with a Web browser installed thereon; one or more hosting servers each including a terminal service for capturing the hosting server's user interface and a control agent for starting a desktop application on the hosting server; a Web server capable of communicating with the client and the one or more hosting servers and including a Web application and a desktop application service, wherein, the Web application generates a desktop application initialization request in response to a request for using a target desktop application from a user of the client through the Web browser, and generates a desktop application exit request in response to a request from the user of the client for ending the desktop application, in response to the desktop application initialization request, the desktop application service starts a desktop application initializing process, determines an appropriate corresponding hosting server for the user, and prepares and provisions desktop application environment on it so that the control agent could start the target desktop application on the corresponding hosting server and the Web application could transmit the corresponding hosting server's address to the client, the browser plug-in is started at the client side, so as to intercept user input at the client side and provide it to the terminal service on the corresponding hosting server, and display the corresponding hosting server's user interface in the Web browser, and via the browser plug-in and the terminal service on the corresponding hosting server, the desktop application interaction is made between the client end and the corresponding hosting server, and in response to the desktop application exit request, the desktop application service stops and exits the target desktop application on the corresponding hosting server.

Viewed from a fourth aspect, the present invention provides a computer program product loadable into the internal memory of a digital computer, comprising software code portions for performing, when said product is run on a computer, to carry out the invention as describe above.

In accordance with other aspects of the present invention, a corresponding computer readable storage medium and computer program product are also provided.

In those solutions according to the present invention, by embedding a remote desktop application's user interface (UI) into a Web application (e.g., Web browser), it is possible for an end user to use the remote desktop application to process files of the Web application. This means that the user could use the desktop application to edit Web files within a Web page. When a user at the client side is using a certain Web application, he may send to a Web server a request for initializing a certain desktop application. After the Web server receives this request, firstly, it finds an existing server which has been installed with the requested desktop application. Such a server that has already installed with or is capable of being installed with the requested desktop application to provide this desktop application is referred to as a hosting server hereinafter. If such a server can't be found, then the Web server will allocate a new hosting server for the user and provide it with the required operation system and the requested desktop application. After the hosting server is ready, the Web server will replicate Web files into the hosting server and start the desktop application with these files. When the desktop application is started, the Web server will return the address of the hosting server (for example, IP address and port number) to the client. At the same time, a terminal plug-in, which can be acquired from the Web server, is downloaded or launched within the same Web browser at the client side. This plug-in immediately connects to the hosting server by using the above terminal addresses and makes the remote desktop application's user interface to be shown in the Web browser at the client side. Then the user could interact with the remote desktop application through the terminal plug-in. In the end, when the user closes the desktop application, those Web files modified and changed during the desktop application interaction will be replicated to the Web server. In this way, Web applications and desktop applications can be converged.

The present invention has several advantages. The first advantage is that it provides a unified Web console for end users to access desktop applications and Web applications. Desktop applications could be regarded as a part of Web applications, and they are hardware independent and operation system independent. A Single Sign-On (SSO) feature is ready under the control of Web applications. Moreover, Web files can be shared between desktop applications and Web applications, and all changes made by desktop applications can be quickly reflected on Web applications.

The second advantage is that management effort for desktop applications can be simplified. For end users, there is no need to download, install, update and maintain desktop applications at the client side. Moreover, in most cases, some desktop applications may be rarely used by users. With these solutions of the present invention, users do not need to install desktop applications locally. Binary codes of desktop applications are executed on the hosting server, thus it is easier to control software license issues. For software vendors, there is no need to rewrite corresponding desktop applications using Web programming models. Furthermore, traditional desktop applications can be integrated with Web applications, and the development cycle of desktop applications can also be reduced. For system administrators, it is easier to manage these desktop applications and the applications could be maintained centrally. On the other hand, all files and data can be stored at the Web server, thus data loss risk is reduced to minimal and data backup is also easier. In the mean time, more powerful resource (e.g., hosting server) could be used to provide better performance for users.

The third advantage is that virtualization and automation technology can be utilized to reduce cost in those solutions according to the present invention. Several existing technologies, such as VMWare, Xen, and IBM LPAR etc., support server virtualization. These technologies could simulate a physical server as several logical servers or virtual servers. These virtual servers may share resource of the same physical server, which could improve resource utilization and sharing. Furthermore, desktop applications could be deployed on these virtual servers, thereby saving hosting cost for service providers. On the other hand, automation technology may be used to provision operation systems (OSs) and desktop applications, thereby facilitating to save deployment time and reduce human error.

These and other advantages of the present invention will become more apparent from the detailed description of preferred embodiments of the invention below given in conjunction with the accompanying drawings.

BRIEF DESCRIPTION OF THE DRAWINGS

This invention can be better understood by referring to the description below given in conjunction with the accompanying drawings, in which the same or similar reference signs are used to indicate the same or similar components throughout the accompanying drawings. These drawings together with the following detailed description form a part of the present specification, and serve to further illustrate preferred embodiments of the present invention and explain principles and advantages thereof, in which.

DETAILED DESCRIPTION OF PREFERRED EMBODIMENTS

Exemplary embodiments of the present invention will be described in conjunction with the accompanying drawings hereinafter. For the sake of clarity and conciseness, not all the features of actual implementations are described in the specification. However, it should be appreciated that, during developing any of such actual implementations, numerous implementation-specific decisions must be made to achieve the developer's specific goals, for example, compliance with system-related and business-related constraints which will vary from one implementation to another. Moreover, it should also be appreciated that, such a development effort might be very complex and time-consuming, but may nevertheless be a routine task for those skilled in the art having the benefit of this disclosure.

It still needs to be explained herein that the accompanying drawings only show device structures and/or processing steps that are closely related to the solution of the present invention and other details that have little relation with the present invention are omitted, so that the present invention will not be obscured by unnecessary details.

Reference is made to the accompanying drawings hereinafter to give a detailed description of preferred embodiments in accordance with the present invention.

Figure 1:
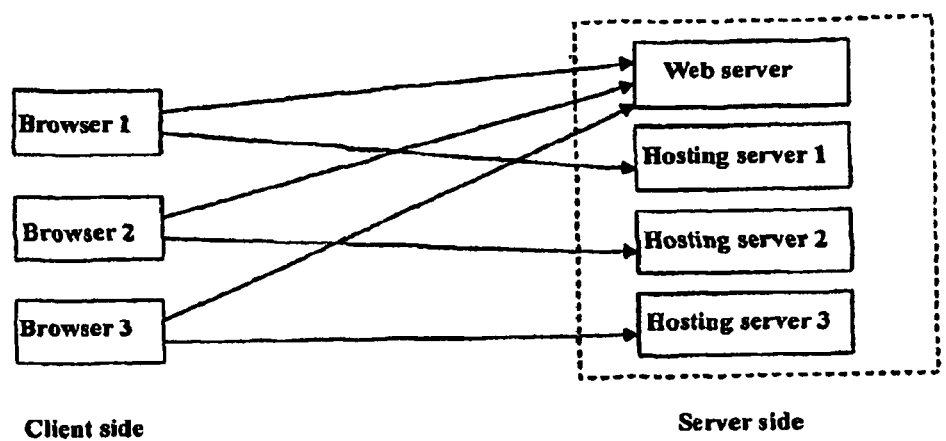
FIG. 1 shows a block diagram of an exemplary computer system to which a preferred embodiment of the present invention can be applied.

First, referring to FIG. 1, a block diagram illustrates a computer system to which a preferred embodiment of the present invention can be applied. As shown in FIG. 1, in accordance with the present invention, only Web browsers are required at the client side; one Web server and three hosting servers are shown at the server side. Although only three hosting servers are shown in this figure, any number of hosting servers can be included. Just as mentioned above, hosting servers refer to those servers for providing related desktop applications.

A Web application and related supporting components are deployed in the Web server. In the hosting server, one or more desktop applications possibly requested by the client have been or can be deployed. For general Web application interaction, a client browser communicates with the Web application deployed on the Web server. When certain desktop application interaction is needed, a corresponding hosting server will be allocated for the user by the Web server. Then, the client communicates with the desktop application deployed on the hosting server. After desktop application interaction finishes, the hosting server is released. After that, the client continues to interact with the Web server. This above procedure might be repeated for many times, depending on client's needs on desktop applications.

Figure 2:
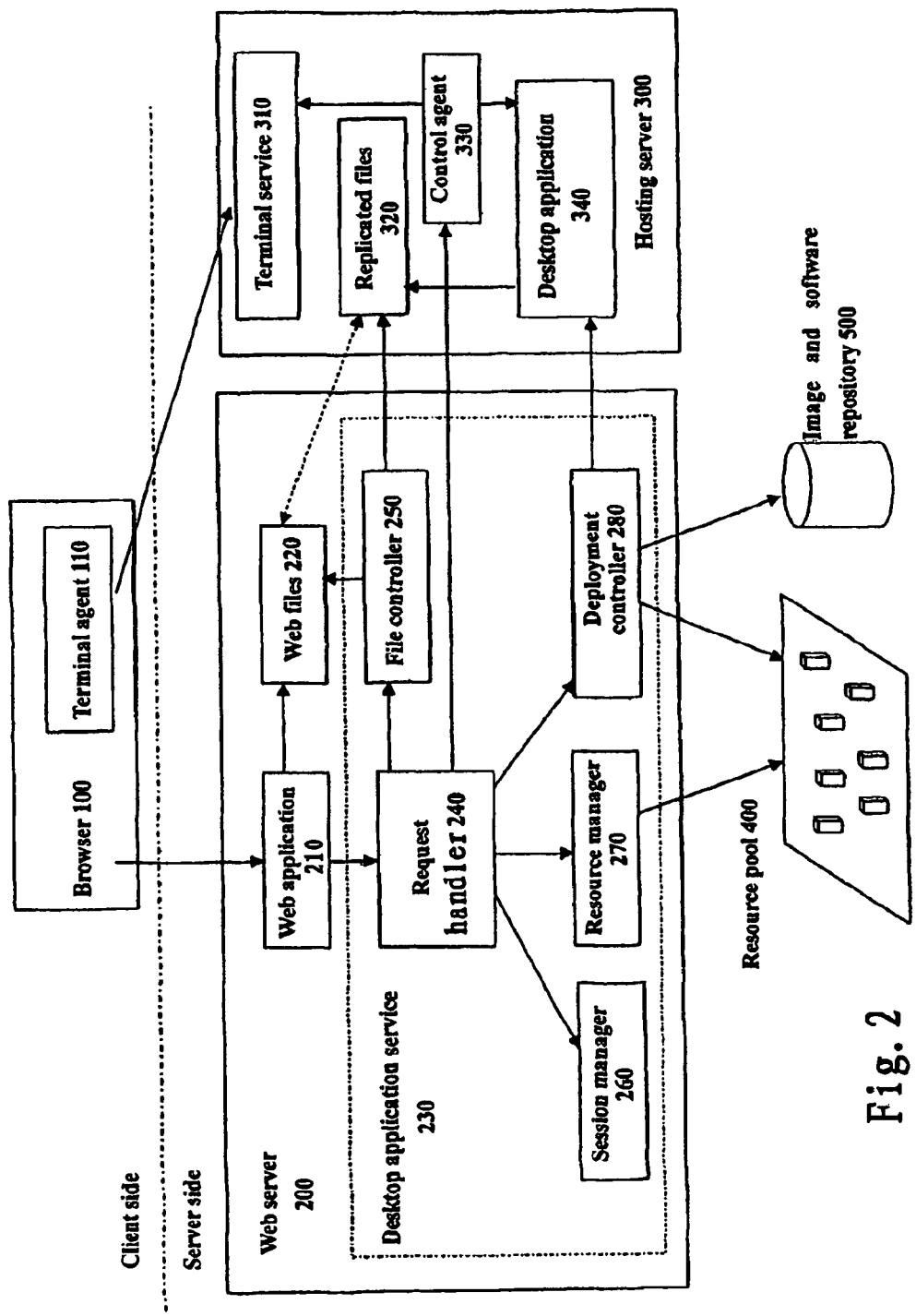
FIG. 2 further shows various components included in the computer system as shown in FIG. 1 in detail.

Next referring to FIG. 2, a diagram illustrates in detail components included in the computer system as shown in FIG. 1. For the sake of simplicity, only one hosting server 300 is shown in FIG. 2. However, those skilled in the art would understand that this computer system may still include one or more other components not shown and usually have more than one hosting server in practice.

As shown in FIG. 2, at the client side, a browser plug-in is installed in the browser 100. This plug-in is referred to as terminal agent 110 hereinafter (Details of this plug-in will be described hereinafter in conjunction with a processing flowchart of the method). It has two major functions: intercepting user input and sending it to a corresponding hosting server (e.g., a hosting server 300 in FIG. 2); and displaying the user interface of the corresponding hosting server in the browser 100. Several existing technologies, such as VNC offered by RealNVC (a kind of remote control software) XWindow manager for Linux/UNIX and the like, could be used to implement this plug-in. In addition to these technologies, a Java applet approach could be used to realize the terminal agent 110 (Java is a registered trademark of Sun Microsystems in the U.S and other countries.

For example, in case of using the Java applet approach, when the applet is initialized, it will connect to a corresponding terminal service 310 running on the hosting server 300, as shown in FIG. 2. Then, a TCP connection could be established. This applet may capture the user's keyboard and mouse events and send them to the corresponding hosting server 300. After the terminal service 310 receives these events, it will generate such events on the hosting server 300 to simulate client interaction. At the same time, the terminal service 310 captures the user interface of the hosting server 300 (i.e., screen) and sends a screen image back to the client. When the terminal agent 110 receives the screen image, it will draw the image within the applet. For security consideration, data transferred between the client and server could be encrypted in practical applications. Furthermore, for performance consideration, image cache could be enabled at the client side while data being transferred could be compressed.

Figure 3:
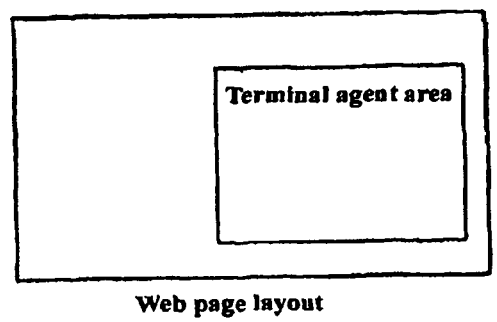
FIG. 3 shows an exemplary Web application page layout in which a desktop application's user interface is integrated.

FIG. 3 shows an exemplary Web application page layout in which a desktop application's user interface is integrated. After the user at the client side enables a remote desktop application through his/her Web browser, the Web page layout as shown in FIG. 3 will appear in the Web browser 100 at the client side by means of the terminal agent 110. That is, the remote desktop application's user interface (UI) will appear in a rectangle area in a Web page on the Web browser at the client side. The rectangle area is controlled by the terminal agent 110 shown in FIG. 2.

Turn back to FIG. 2 again. As shown in FIG. 2, on the Web server 200 at the server side, a Web application 210 needs to call a desktop application service 230 to handle usage requests for desktop applications. When the client requests to use a certain desktop application, the Web application 210 generates a desktop application initialization request for asking the desktop application service 230 to make preparation. As shown in FIG. 2, the desktop application service 230 mainly comprises the following components: a request handler 240, a file controller 250, a session manager 260, a resource manager 270 and a deployment controller 280.

Besides these components, as shown in FIG. 2, at the server side, there may also include a resource pool 400 containing one or more servers, which is used to provide the required hosting server(s), for example, the hosting server 300 (for the sake of explanation, only one hosting server 300 is shown in FIG. 2, but in fact any number of hosting servers can be included); and an image and software repository 500 for storing server images and installation software for a plurality of desktop applications that might be requested by the client.

The request handler 240 provides several interfaces to the Web application 210, which are as follows:

(1) Desktop Application Initialization

In the desktop application initialization request sent from the Web application 210 to the desktop application service 230, the client needs to send version information of the desktop application and a list of files which need to be opened by the desktop application. In addition, a file synchronization option and a restore options could be included in the initialization request. Furthermore, Web session information could also be included so that the request handler 240 could reuse the same hosting server for the same user. For example, the following is an exemplary XML initialization request:

```
<initializereq>
    <application name="Photoshop" version="7.0" vendor="Adobe">
    <file url="/images/header.jpg" location="crl.ibm.com:/shared/
myproject/header.jpg" synchronization_interval=10s refresh=true/>
        <file url="/images/footer.jpg"
        location="crl.ibm.com:/shared/myproject/
footer.jpg" synchronization_interval=20s refresh=false/>
        </application>
<application name="Word" version="2003" vendor="Microsoft">
<file url="/docs/news.doc" location="crl.ibm.com:/shared/doc/
news.doc"/>
</application>
<session id="DFAWER214ASDFD"/>
<restore imageid=23>true</restore>
</initializereq>
```

From the initialization response of the desktop application service 230 to the above initialization request, the client could know whether this request is handled successfully or not. The address of the hosting server can also be known so that the client browser could know how to connect to the hosting server. For example, the following is an exemplary XML initialization response:

```
<initializeresp>
    <result value="success" appid="1"/>
    <address value="myhost:myport"/>
</initializeresp>
```

(2) Desktop Application Exit

After the user has finished using the desktop application, the Web application 210 may request to exit the desktop application so that related resource could be recycled. The Web session information could be included in the exiting request so that the request handler 240 can know which hosting server needs to be recycled. Moreover, a backup option could also be included in the exiting request so that the hosting server environment could be backed up as necessary. For example, the following is an exemplary XML exiting request:

```
<exitreq>
    session id="DFAWER214ASDFD" />
    <backup>true</backup>
</exitreq>
```

From the response to the exiting request, the Web application 210 could know the result of the operation. For example, the following is an exemplary XML exiting response:

```
<exitresp>
    <result value="success"/>
    <image id=23/>
</exitresp>
```

(3) Query

The query function enables the Web application 210 to check the status of the current environment. For example, the following status could be checked:

Available applications;

Running status of the hosting server for a session.

In the Web application, when there is a need to utilize a desktop application, it could firstly query available desktop applications and then list them, for example, in the form of a list.

For each desktop application, the following attributes could be displayed for the user's selection: application name, version, vendor and operation system (OS). The above information can be obtained from the resource manager 270, the detailed description of which will be given below. In the Web application 210, the list of available desktop applications could be modified according to the user's authority and demand.

When the user requests to use a certain desktop application through the Web browser 100 and submits the form, the Web application 210 will generate a desktop application initialization request and send it to the request handler 240. The request handler 240 will firstly check the session manager 260 to determine whether there is already a running hosting server for this current session or not. If such a hosting server is determined as not present, then it will request the resource manager 270 to allocate one hosting server from the resource pool 400, for example, hosting server 300, to run the requested desktop application. After the resource allocation is done, the request handler 240 will request the deployment controller 280 to prepare and provide hosting server environment and acquire the hosting server's address, such as IP address and port number. Then, the session manager 260 saves the hosting server address information and user session information. At last, the request handler 240 sends the hosting server address back to the Web application 210. The Web application 210 sends to the user browser side a page which includes plug-in (i.e., the terminal agent 110) information and the hosting server address. After the user browser 100 receives the response, it will start the plug-in, i.e., terminal agent 110. Here, it needs to be noted that the plug-in is only required to be downloaded from the Web server when the client accesses the remote desktop application via the browser for the first time; and as the case may be, the plug-in could be stored on the Web server or anywhere else on the network accessible by the Web server (For the sake of simplicity, it isn't shown in FIG. 2). This procedure described above is shown in FIG. 4.

Figure 4:
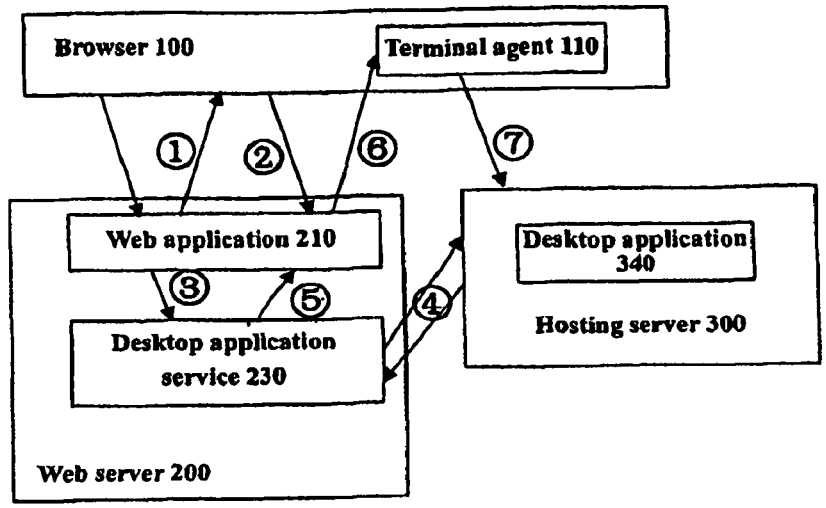
FIG. 4 simply shows user interaction and session replication processes of the computer system as shown in FIG. 2 during the desktop application initialization.
Figure 5:
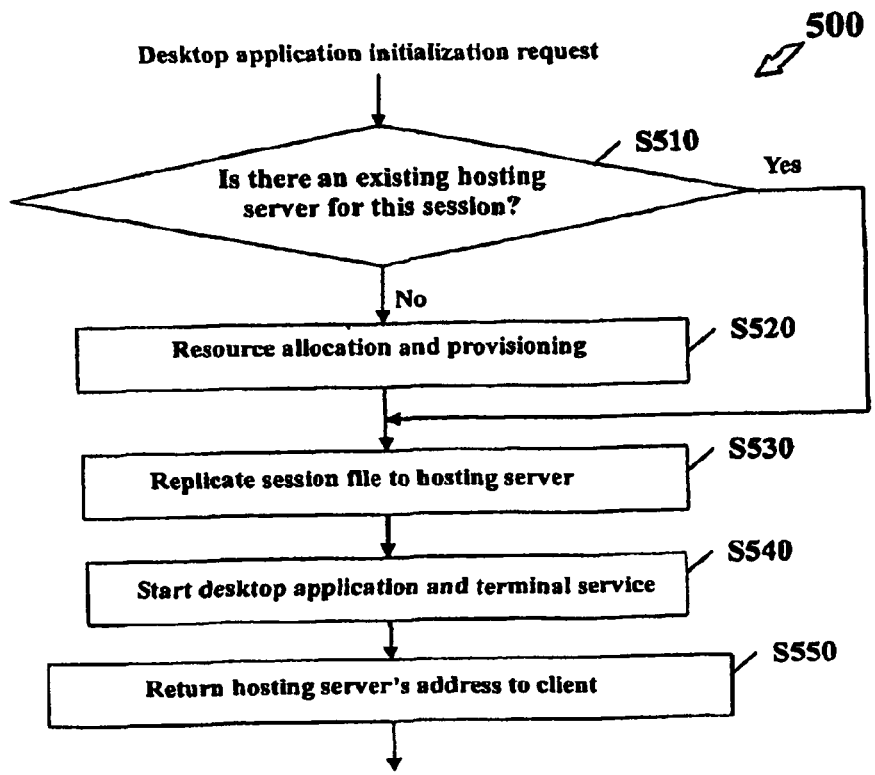
FIG. 5 shows a flowchart of a process 500 executed during the desktop application initialization in accordance with a preferred embodiment of the present invention.

FIG. 4 simply shows user interaction and session replication processes of the computer system as shown in FIG. 2 during the desktop application initialization. Just as described above, '1' shows Web application interaction using session tokens; '2' shows that the client requests for a desktop application in the Web application; '3' shows that the Web application 210 sends a desktop application initialization request to the desktop application service 230; '4' shows preparing desktop application environment, that is, a desktop application initialization process, details of which will be described thereinafter with reference to the flowchart as shown in FIG. 5; '5' shows that the desktop application service 230 responds to the Web application 210; '6' shows that the Web application 210 responds to the browser; and '7' shows that the browser 100 starts the terminal agent 110 and connects to a desktop application 340.

After finishing the desktop application interaction as described above, the user may, for example, send a request to the Web application 210, which then generates a desktop application exit request and send it to the request handler 240 of the desktop application service 230. If the user wants to save his/her hosting server currently allocated for future use, the deployment controller 280 may store the entire server image of this hosting server to the image and software repository 500. After that, the request handler 240 calls the deployment controller 280 to clean up the target hosting server, for example, clear some files generated during the user's usage so that they would not be seen by other users later, and asks the resource manager 270 to release the hosting server. This above process will be described in detail hereinafter with reference to the flowchart shown in FIG. 6.

Turn back to FIG. 2 again. The session manager 260 is used to maintain and save user session. After receiving the desktop application initialization request, the request handler 240 checks the session manager 260 to determine whether or not there is already a hosting server running for this session. If such a server is not present, the session manager 260 saves this session ID and allocated hosting server ID. If such a server is already present, the request handler 240 will return the hosting server's IP address and port number.

In the resource pool 400, there may be one or more servers of different types, such as Intel/AMD PC server and UNIX server, etc. These servers might have already installed an operation system and desktop applications, but it is also possible that no operation system and desktop application is installed therein. In addition to physical servers, the resource pool 400 might also include one or more virtual servers.

The resource manager 270 maintains the resource pool 400 and handles resource allocation requests and resource release requests. The resource manager 270 keeps track of all servers in the resource pool 400 and saves their detailed information. Such information may include the servers' hardware type and configuration, IP address, OS type, name and version information of desktop applications installed or stored in the server, etc. Based on this information, the resource manger 270 could allocate or determine the best suitable server with respect to a resource allocation request. When a certain resource allocation request is received, the resource manger 270 may find a matched server in the resource pool 400 based on the desktop application and its required OS name. If a matched server (i.e. hosting server) is found, then the matched server will be marked as "in use", and its IP address and port number will be returned. If no matched server is found, then the resource manger 270 will select a suitable hosting server from the resource pool 400 for provisioning and mark it as "in use". This above process will be described in detail with reference to the flowchart shown in FIG. 7 hereinafter. When a resource release request is received, the resource manager 270 will release the server in use and mark it as "free". If the server in use is a virtual server rather than a real physical server, the resource manager 270 will destroy this server and release the allocated resource.

In other words, both physical servers and virtual servers could be managed by the resource manager 270. For a physical server, it is managed by the resource manager 270 at a box level, which means only one physical server could be allocated for a single user each time. For a virtual server, the host platform on which it runs could be shared by different users. Each user may only use a virtual server, which only consumes part of physical server resource. Virtual servers could be prepared in the resource pool 400 prior to allocation or provided on demand.

The deployment controller 280 is an automation engine for auto-installation. It could install a remote system automatically. The installation work includes OS installation, application program installation, software configuration, system updating, and server backup etc. Installation software is generally stored in the image and software repository 500. The deployment controller 280 could be implemented by several existing products, such as IBM's Director for Windows/Linux provisioning or IBM's NIM for AIX provisioning.

The major function of the file controller 250 is synchronizing files between the Web server 200 and the hosting server 300. The file controller 250 communicates with a control agent 330 in the hosting server 300 to finish this task. During the desktop application initialization, it replicates those files specified in the desktop application initialization request to the home directory of hosting server 300. During exiting the desktop application, it replicates all files modified or updated during the desktop application interaction from the hosting server 300 to original locations on the Web server 200 or other locations. During the desktop application initialization and the desktop application exit, the file controller 250 could replicate all the modified or updated files on the hosting server 300 to a certain temporary location on the Web server 200 repeatedly. This is for the purpose of backup to prevent these files from being lost after the hosting server 300 crashes for some reasons. Of course, as an alternative, the file controller 250 may also directly replicate all the modified or updated files to original locations on the Web server 200 to overwrite those original files, so that the modification or updating made can be reflected immediately. It can be set by the user based on his requirements.

In the image and software repository 500, two kinds of data are stored, that is, desktop application/OS installation software and server images. Installation software is used for first time installation of a corresponding desktop application or operation system on a hosting server (it may be either physical or virtual). Server images are snapshot/backup of existing servers. Installation software may have the following attributes: software name, version, vendor and installation script. Server images may have the following attributes: software list, image creation date, user ID and hardware type.

On each hosting server (e.g., hosting server 300 shown in FIG. 2), in addition to the desktop application 340, two components are also installed, i.e., the terminal service 310 and the control agent 330.

The terminal service 310 communicates with the terminal agent 110 to obtain user input at the client side and reproduce it on the hosting server 300 side. It also captures the UI on the hosting server and sends it to the terminal agent 110 at the client side. In this way, the user could call and control the remote desktop application through the Web browser. Similar to the terminal agent 110, the terminal service 310 could also be implemented by several existing technologies such as VNC and Java applet, etc.

The control agent 330 mainly has file synchronization and application controlling functions. The control agent 330 interacts with the file controller 250 on the Web server 200 to synchronize files. The control agent 330 could also monitor the user's local directory on the hosting server and track file change events. When a certain file is modified or updated, it may notify the file controller 250 to replicate the modified or updated file. In the desktop application initialization stage, the control agent 330 needs to start the target application and load input files. In the desktop application exit stage, the control agent 330 needs to stop and exit the desktop application in use. Herein, the control agent could also be implemented by means of script or program.

Figure 6:
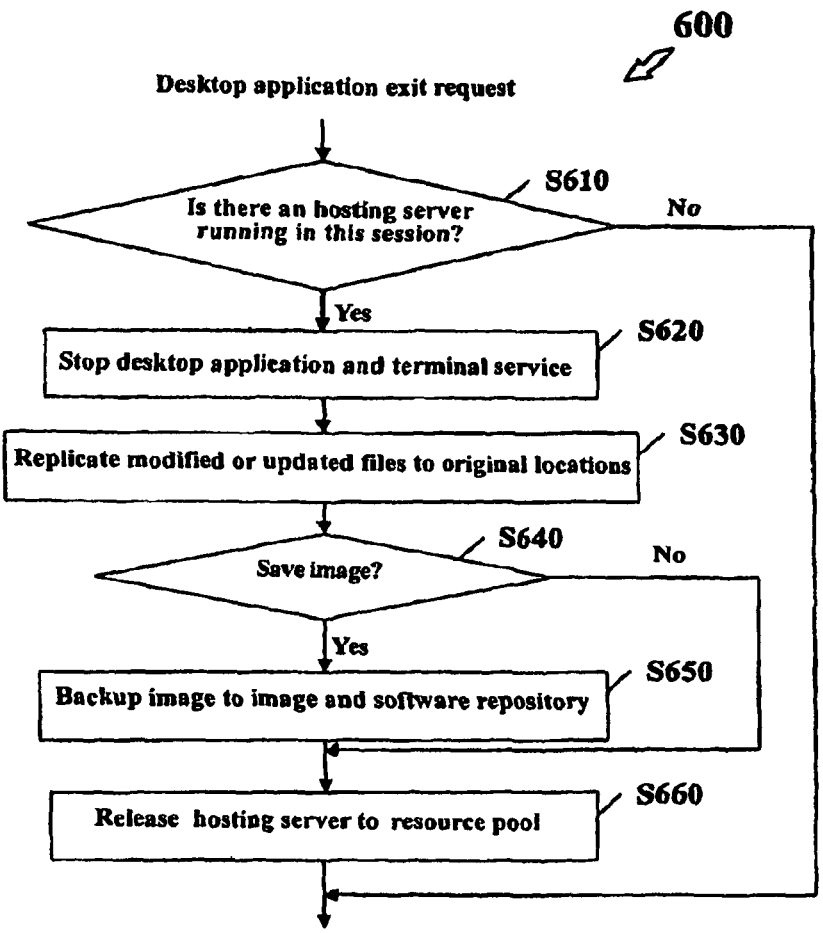
FIG. 6 shows a flowchart of a process 600 executed during the desktop application exit in accordance with a preferred embodiment of the present invention.
Figure 7:
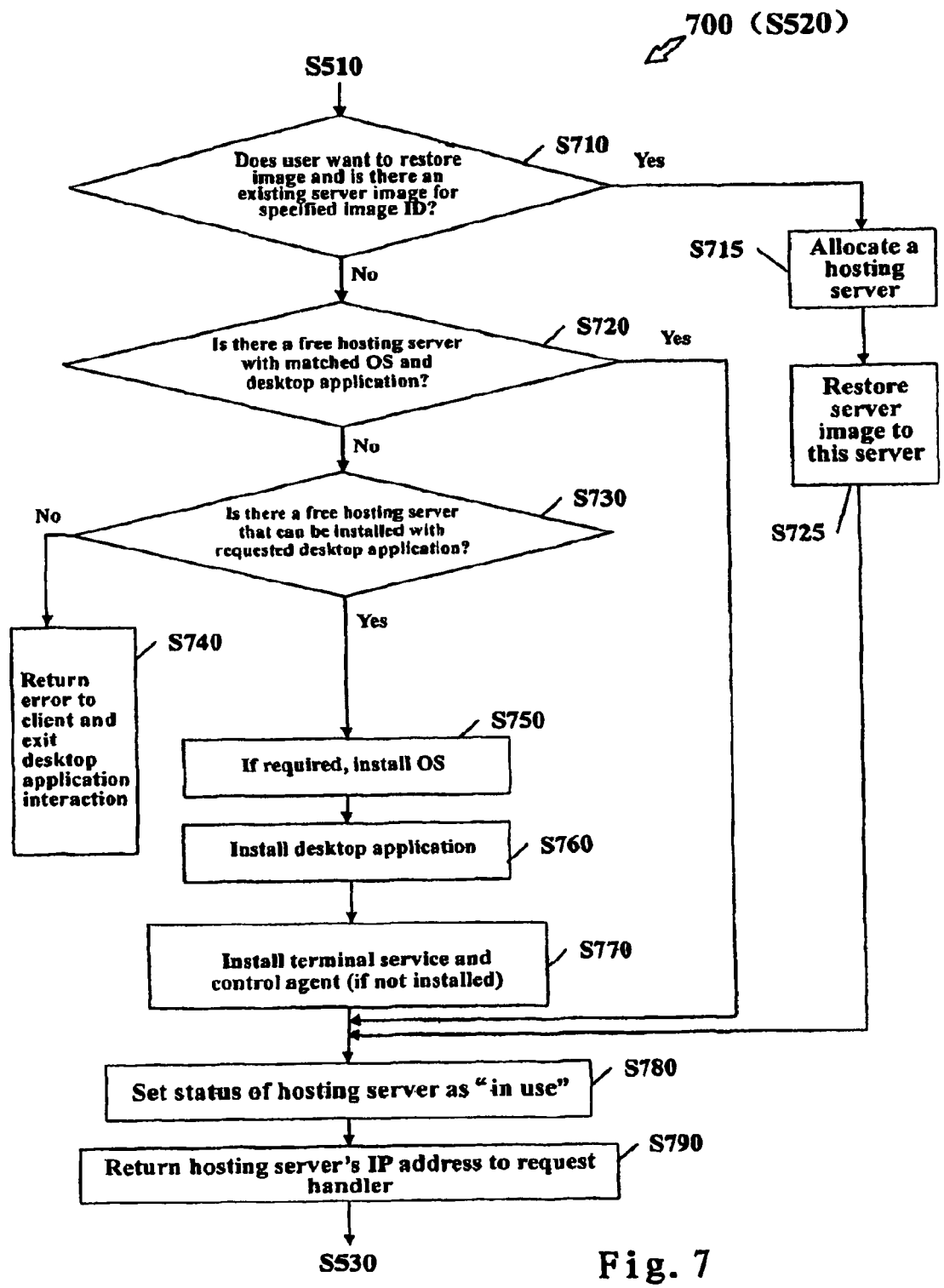
FIG. 7 shows a flowchart illustrating in detail a specific process 700 of a resource allocation and provisioning step S520 in the process 500 as shown in FIG. 5 in accordance with a preferred embodiment of the present invention.

Detailed description will be given in conjunction with the flowcharts as shown in FIG. 5 to FIG. 7 to illustrate the functions of the above components and the processing flow of an exemplary method for converging a desktop application and a Web application in accordance with the present invention. FIG. 5 shows a flowchart of a process 500 executed during the desktop application initialization in accordance with an embodiment of the present invention; FIG. 6 shows a flowchart of a process 600 executed during exiting the desktop application in accordance with an embodiment of the present invention; and FIG. 7 shows in detail a specific process 700 in a resource allocation and provisioning step S520 in the process 500 as shown in FIG. 5 in accordance with an embodiment of the present invention.

As described above, after the Web application 210 generates the desktop application initialization request, the desktop application initialization process 500 will be started, as shown in FIG. 5. At step S510, the request handler 240 checks the session manager 260 to determine whether there is an existing hosting server for this session or not. If a negative result is obtained at step S520, that is, if such a hosting server can't be found, the process proceeds to step S520 where resource is allocated and provisioned by means of the resource manager 270 and deployment controller 280 (its further description will be given hereinafter with reference to FIG. 7), and then the process 500 proceeds to step S530. Or otherwise, if it is determined that such a hosting server exists at step S520, the process 500 directly proceeds to step S530. At step S530, the file controller 250 replicates the current session file (e.g., Web files 220 shown in FIG. 2) to the hosting server (e.g., hosting server 300 shown in FIG. 3). At step S540, the control agent 330 starts the required desktop application 340 and terminal service 310 on the hosting server 300. At step S550, the hosting server's IP address and port number are returned to the client side (if the user accesses the remote desktop application via his browser for the first time, the client browser plug-in, i.e., terminal agent 110 is returned to the client at the same time) and then the desktop application initialization process 500 ends. After that, the user can startup the terminal agent 110 at the client side and begin to interact with the desktop application on the hosting server 300.

After the user has finished the desktop application interaction, he/she may send a request to the Web application 210, then the Web application 210 sends a desktop application exit request and thus the desktop application exit process 600 as shown in FIG. 6 will be started.

As shown in FIG. 6, at step S610, the request handler 240 checks the session manager 260 to determine whether there is a hosting server running in this session. Since the hosting server 300 is really allocated and run during the desktop application interaction as described above, the determination result at step S610 is positive and thus the desktop application exit process 600 proceeds to step S620; or otherwise, the process 600 ends. At step S620, the control agent 330 stops the desktop application 340 and terminal service 310 on the hosting server 300. Then, at step S630, by means of communication between the file controller 250 and the control agent 330, all the files modified or updated during the desktop application interaction are replicated to the original locations on the Web server 210 to overwrite original files. Next, at step S640, it is determined whether the user wants to save the image of the current hosting server for future use. For example, it can be realized in the following manner. The Web application can take "backup application" as an option and after the user selects this option, a parameter will be carried in the desktop application exit request sent by the Web application to the desktop application service to ask for backup of the current application. For example, the <backup> field in the <exitreq> message given above can be referred to. The request handler checks this parameter. If it is determined that the user wants to save the image of the current hosting server at step S640, the process 600 proceeds to step S650, where the deployment controller 280 stores the image of the entire hosting server to the image and software repository 500, and then the process proceeds to step S660. Or otherwise, the desktop application exit process 600 will directly jump to step S660, where this hosting server is cleared by the deployment controller 280 and then released by the resource manager 270 to the resource pool 400, then the desktop application exit process 600 shown in FIG. 6 ends.

Detailed description of the processing of step S520 shown in FIG. 5 (i.e., resource allocation and provisioning process 700) in accordance with an embodiment of the present invention is further given in conjunction with the flowchart in FIG. 7 below.

As shown in FIG. 7, at step S710, it is decided whether or not the user wants to restore server image and there is an existing server image for the image ID specified in the desktop application initialization request in the image and software repository 500. Herein, reference could be made to the <restore> field in the exemplary <initializereq> message given above as for the image ID. For example, before the user requests to startup the desktop application, he/she could query the server images and their image IDs already stored in the image and software repository by means of the Web application and when the user requests to startup the desktop application, he/she could input an image ID. If the decision result is negative at step S710, the process 700 proceeds to step S720 to determine whether there is a free hosting server with matched OS and desktop application or not. If the decision result is positive at step S720, the process 700 jumps directly to step S780. If the decision result is negative at step S720, then at step S730, it is determined whether there is a free hosting server that can be installed with the requested desktop application. If it is determined that such a hosting server is not present at step S730, then at step S740, an error will be returned to the client and thus the desktop application interaction is exited. Or otherwise, if it is determined that such a hosting server is present at step S730, then at step S750, an operation system is installed on the hosting server if required (of course, if there is the operation system installed on this hosting server, this step can be skipped). Next, at step S760, the required desktop application is installed on the hosting server. Subsequently, the process proceeds to step S770 to install the terminal agent and control agent on the hosting server, wherein the terminal agent and control agent can be stored in, for example, the image and software repository 500 (of course, if the terminal agent and control agent have already been installed on this hosting server, this step can be skipped). After that, at step S780, the status of hosting server is set as "in use", then at step S790, the hosting server's IP address is returned to the request handler 240, thereby the resource allocation and provisioning process 700 as shown in FIG. 7 is finished. Then, step S530 shown in FIG. 5 will be proceeded to.

Figure 8:
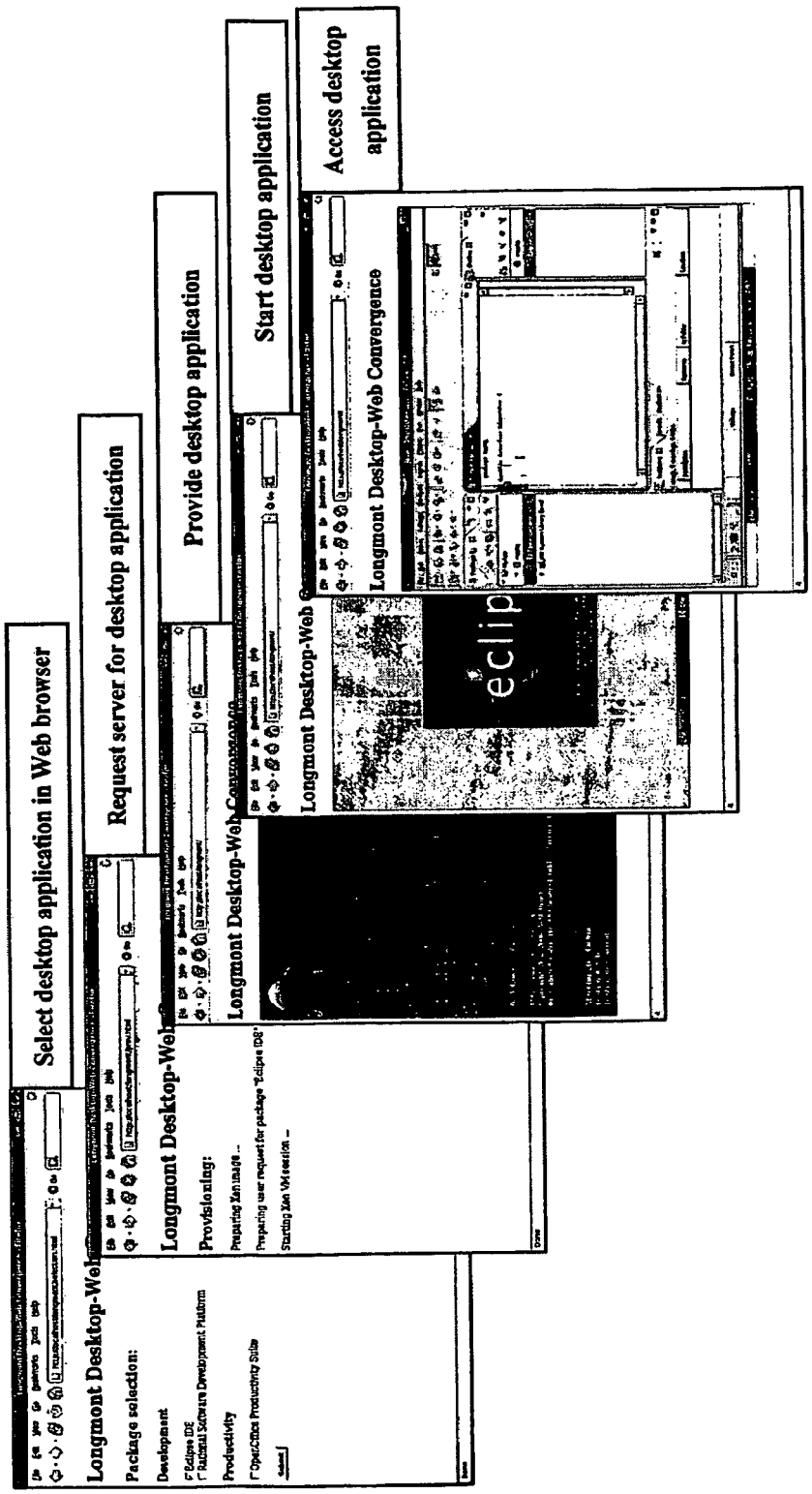
FIG. 8 shows exemplary screen snapshot images of a client computer when utilizing the method and system according to a preferred embodiment of the present invention.

FIG. 8 is an example of applying the method and system in accordance with an embodiment of the present invention. In this figure, a plurality of screen snapshot images of the client computer from the time when the user selects a certain desktop application on the Web browser to the time when the user accesses the remote desktop application at the client side are shown in sequence.

From the above description of the computer system and method in accordance with exemplary embodiments of the present invention, it can be easily seen that, according to the present invention, the end user could call the remote desktop application via his/her Web browser at the client side, just as if this desktop application is a part of the Web application. Files can be synchronized between the Web server and the hosting server and all the files and data can be stored on the Web server, therefore, these files and data can be shared by many users and it is easier to manage and backup data on the Web server. In addition, according to the present invention, traditional desktop applications and the Web application can be converged or integrated together, therefore, more plentiful desktop applications can be provided for the Web application of the end user, thereby making the user's Web experience more plentiful and interesting.

Of course, there might have other advantages besides those described above, which will not be enumerated one by one.

Although description is given in conjunction with the flowcharts shown in FIG. 5 to FIG. 7 as for the functions of the system and its components shown in FIG. 2 and the processing flow of the corresponding method in accordance with exemplary embodiments of the present invention, those skilled in the art would appreciate that the above system block diagram and processing flowcharts are only exemplary and various changes may be made thereto depending on design requirements and practical requirements without departing from the essence and scope of the present invention. For example, the server images and desktop application installation software are stored in one image and software repository as shown in FIG. 2, but they can be stored in different repositories, respectively. At step S630 shown in FIG. 6, as an alternative, those files modified or updated during the desktop application interaction can be replicated to a temporary location on the Web server 210 rather than original locations, so as to prevent these file being lost after the hosting server crashes for some unexpected faults. Furthermore, the processes described in conjunction with the flowcharts shown in FIGS. 6 and 7 are based on the premise that the option of "saving server image" has been selected by the user. However, the present invention can also be applied to a situation that the option of "saving server image" is not selected. At this time, the repository 500 shown in FIG. 2 does not need to save the server image and some determination steps in the shown process flowcharts could also be skipped. Moreover, at step S715 shown in FIG. 7, although it is not definitely indicated, it should be understood by those skilled in the art that the allocated hosting server can be either a real and independent physical server or a virtual server that can be shared by many users. Of course, there might have other alternatives, which will not be enumerated one by one herein.

Although no complete flowchart of the method according to the exemplary embodiments of the present invention is given in the accompanying drawings, it is obvious that those skilled in the art could draw the corresponding flowchart without any efforts based on the literal description of the present invention and the flowcharts in FIG. 5 to FIG. 7.

Furthermore, it is obvious that the operation procedures of the method according to the present invention described above can also be implemented in the form of a computer executable program stored in various machine readable storage media.

Moreover, the objects of the present invention can also be implemented by providing a storage medium with codes of the above executable program stored thereon directly or indirectly to a system or device, and then reading out and executing the program codes by a computer or center processing unit (CPU) of the system or device.

At this time, as long as the system or device has a function of executing a program, implementing modes of the present invention are not limited to the program, and the program can be in any form of for example, an object program, program executed by an interpreter, or script program provided to an operating system, etc.

The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program codes according to the present invention and installing the same into the computer and then executing the program codes.

Finally, it is also noted that, in this document, relational terms such as left and right, first and second, and the like are used merely to distinguish one entity or action from another entity or action without necessarily requiring or implying any actual such relationship or order between such entities or actions. Moreover, the terms "comprise", "comprising," "include" or any other variations thereof, are intended to cover a non-exclusive inclusion so that a process, method, article, or device that comprises a list of elements does not only include these elements but also may include other elements not explicitly listed or inherent to such process, method, article, or device. An element preceded by "a" or "an" does not, without more constraints, preclude the existence of additional identical elements in the process, method, article, or device that comprises the element.

Although the embodiments of the present invention have been described in detail with reference to the accompanying drawings, it should be noted that, these embodiments are only used to illustrate the present invention but not to limit the present invention. Various modifications and changes can be made by those skilled in the art without departing from the scope of the present invention. Therefore, the scope of the present invention is only defined by the appended claims and the equivalents thereof.

The invention claimed is:

1. A method for converging a desktop application and a Web application, the Web application being included in a Web server, the method comprising steps of:
   in response to a request from a client user for using a target desktop application, starting a desktop application initialization process on the Web server and determining an appropriate corresponding hosting server for the user;
   preparing and provisioning desktop application environment on the corresponding hosting server and starting the target desktop application, wherein the preparing and provisioning includes installing the target desktop application on the corresponding hosting server if the target desktop application has not been previously installed;
   transmitting the corresponding hosting server's address to the client so as to make desktop application interaction between the client and the corresponding hosting server;
   in response to the completion of the desktop application interaction, stopping and exiting the target desktop application on the corresponding hosting server; and
   wherein when the user requests to use the desktop application for the first time, a browser plug-in is simultaneously transmitted to the client in the transmitting step, so as to intercept user input at the client side and display the corresponding hosting server's user interface in a Web browser at the client side.

2. The method according to claim 1, wherein all files on the corresponding hosting server and the Web server are synchronized during the desktop application interaction.

3. The method according to claim 1, further comprising a step of storing server image of the corresponding hosting server and releasing the corresponding hosting server after exiting the target desktop application.

4. The method according to claim 1, wherein determining an appropriate corresponding hosting server for the user comprises:
 if there is a hosting server for the current session in a resource pool at present, then determining it as the corresponding hosting server;
 or otherwise, according to the target desktop application and its required operating system information, finding from the resource pool a matched hosting server as the corresponding hosting server.

5. The method according to claim 4, wherein preparing and provisioning desktop application environment on the corresponding hosting server comprises:
 if said target desktop application has not been installed on the corresponding hosting server, installing an operating system required by the target desktop application on the corresponding hosting server as necessary; and
 storing, in a repository accessible by the Web server, installation software for a plurality of desktop applications including the target desktop application and their required operating systems.

6. A computer program product loadable into the internal memory of a digital computer, comprising software code portions for performing, when said product is run on a computer, to carry out the steps of a method as claimed in claim 1.

7. A method for converging a desktop application and a Web application, the Web application being included in a Web server, the method comprising steps of:
 in response to a request from a client user for using a target desktop application, starting a desktop application initialization process on the Web server and determining an appropriate corresponding hosting server for the user;
 preparing and provisioning desktop application environment on the corresponding hosting server and starting the target desktop application, wherein the preparing and provisioning includes installing the target desktop application on the corresponding hosting server if the target desktop application has not been previously installed;
 transmitting the corresponding hosting server's address to the client so as to establish a desktop application interaction within the Web application between the client and the corresponding hosting server, wherein the client modifies content of the Web application during the desktop application interaction;
 in response to the completion of the desktop application interaction, stopping and exiting the target desktop application on the corresponding hosting server; and
 wherein when the user requests to use the desktop application for the first time, a browser plug-in is simultaneously transmitted to the client in the transmitting step, so as to intercept user input at the client side and display the corresponding hosting server's user interface in a Web browser at the client side.

8. The method according to claim 7, wherein all files on the corresponding hosting server and the Web server are synchronized during the desktop application interaction, and Web files modified during the desktop application interaction are replicated to the Web server.

9. The method according to claim 7, further comprising a step of storing server image of the corresponding hosting server and releasing the corresponding hosting server after exiting the target desktop application.

10. The method according to claim 7, wherein determining an appropriate corresponding hosting server for the user comprises:
 if there is a hosting server for the current session in a resource pool at present, then determining it as the corresponding hosting server;
 or otherwise, according to the target desktop application and its required operating system information, finding from the resource pool a matched hosting server as the corresponding hosting server.

11. The method according to claim 7, wherein preparing and provisioning desktop application environment on the corresponding hosting server comprises:
 if said target desktop application has not been installed on the corresponding hosting server, installing an operating system required by the target desktop application on the corresponding hosting server as necessary; and
 storing, in a repository accessible by the Web server, installation software for a plurality of desktop applications including the target desktop application and their required operating systems.

12. A computer readable storage medium comprising a computer readable program, wherein the computer readable program when executed on a computer causes the computer to perform the steps of a method as claimed in claim 7.

13. A method for converging a desktop application and a Web application, the Web application being included in a Web server, the method comprising steps of:
 in response to a request from a client user for using a target desktop application, starting a desktop application initialization process on the Web server and determining an appropriate corresponding hosting server for the user;
 preparing and provisioning a desktop application environment on the corresponding hosting server and starting the target desktop application, wherein preparing and provisioning the desktop application environment on the corresponding hosting server comprises:
  if said target desktop application has not been installed on the corresponding hosting server, installing an operating system required by the target desktop application on the corresponding hosting server as necessary; and
  installing the target desktop application on the corresponding hosting server, wherein installation software for a plurality of desktop applications including the target desktop application and their required operating systems is stored in a repository accessible by the Web server;
 transmitting the corresponding hosting server's address to the client so as to make desktop application interaction between the client and the corresponding hosting server;
 in response to the completion of the desktop application interaction, stopping and exiting the target desktop application on the corresponding hosting server; and
 wherein when the user requests to use the desktop application for the first time, a browser plug-in is simultaneously transmitted to the client in the transmitting step, so as to intercept user input at the client side and display the corresponding hosting server's user interface in a Web browser at the client side.

\* \* \* \* \*